3,445,546
BLENDS COMPRISING ETHYLENE/METHACRYLIC ACID COPOLYMER, POLYETHYLENE, AND ETHYLENE/VINYL ACETATE COPOLYMER

James Thompson Pledger, Jr., Orange, Tex., assignor to E. I. du Pont de Nemours and Company, Wilmington, Del., a corporation of Delaware
Filed Dec. 29, 1966, Ser. No. 605,624
Int. Cl. C08f 29/30, 29/26
U.S. Cl. 260—897                               4 Claims

ABSTRACT OF THE DISCLOSURE

Blends of 50–90% ethylene/methacrylic acid random copolymer, 5 to 45% polyethylene and at least about 5% ethylene/vinyl acetate that can be melt extruded into films.

---

The present invention relates to polyethylene blends, and, more particularly, to blends containing polyethylene, copolymers of ethylene and methacrylic acid, and copolymers of ethylene and vinyl acetate.

It is the primary object of the present invention to provide polyethylene blends which can be melt extruded into films that combine a high degree of toughness with a high yield strength.

The blends of the present invention comprise three components of (a) about 50 to about 90% by weight copolymer of ethylene and methacrylic acid, containing from 2 to 10 mole percent, based on copolymer, of the acid and having a melt index in the range of 0.5 to 50 dg./min. with (b) about 5 to about 45 weight percent, and preferably 10 to 20 weight percent, based on the blend, of a polyethylene having a density of 0.910 to 0.970 g./cc., and preferably a density of 0.945 to 0.970 g./cc., and a melt index in the range of 0.1 to 20 dg./min., and (c) at least about 5 weight percent, but preferably not more than 30 weight percent, based on the weight of the blend, of an ethylene-vinyl acetate copolymer containing about 5 to 15 mole percent based on the weight of the copolymer of vinyl acetate and having a melt index in the range of about 0.5 to 20 dg./min. The blends have a melt index in the range of about 15 to 25 dg./min.

The use of polyethylene film as packaging material in the form of bags to package fertilizer and other pulverulent material is well known. In order to qualify for such industrial packaging uses, it is essential that the resin employed for the bags combine toughness with high yield strength to prevent bursting and tearing of the bags during shipping and/or storage. The most widely used method employed to measure film toughness is Elmendorf Tear Strength ASTM-D-1424–56–T.

The ethylene-methacrylic acid copolymers employed in the present invention are preferably uniformly random copolymers, i.e. copolymers which contain substantially the same acid concentration in all of the molecules and have the acid comonomer distributed in a random manner in each of the molecules of the copolymer. The uniformly random copolymers are preferred in the process of the present invention since they permit completely homogeneous blends in which both components are compatible with each other. Non-uniform copolymers which contain high localized acid concentrations in their molecular structure, are not readily compatible and, thus, do not give rise to optimum values in the properties characteristic of the blends of the present invention. As a result of the significantly higher reactivity of methacrylic acid in polymerization as compared to ethylene, any polymerization in which the acid concentration decreases during polymerization will result in non-uniform and non-random copolymers. Hence, the copolymers most suitable in the present invention are those obtained in the polymerization environment in which the acid concentration, the ethylene concentration, and the resulting copolymer concentration is maintained constant. Constant environment polymerization reactors and processes are described in the prior art, for example, see Canadian Patent No. 655,298 to Armitage.

The ethylene vinyl acetate component of the blend is likewise preferably a random copolymer. This copolymer can also be produced in a constant environment process. Such copolymers are disclosed in U.S. Patent No. 3,029,230, issued Apr. 10, 1962.

The blends of the present invention are prepared by standard techniques. One preferred method comprises dry blending the components and then extruding the mixture through an extruder equipped with a working torpedo in the screw which homogenizes the molten polymer components of the blend. The resulting blend is then extruded and pelletized. The pelletized blend can then be extruded into film using conventional extrusion equipment and procedures to give rise to films with the aforesaid combination of toughness and tensile properties.

The blends of the present invention are particularly useful as films in that films of the composition are extremely tough and at the same time relatively stiff. The blends may also be employed as a molding resin for the resin retains its toughness and flexibility at low temperatures, and has high yield strength.

The properties of the blend of the present invention are further illustrated in Table I. The data illustrated were obtained using a two inch extruder and a 10 mil annular film die of 4 inches diameter. The polymer melt was heated to 190° C. at the extrusion die and the screw speed was adjusted to deliver about 40 lbs. of polymer per hour. The film was taken off at a rate of 12 f.p.m. and blown up to twice the diameter of the die. The resulting film had film gauge of approximately five mils. All melt index values illustrated in the table and otherwise employed in the description of this invention are based on ASTM-D-1238–57–T.

TABLE I

| Resin No. | E/MAA, Percent | Mole percent MAA | MI | E/VA, Percent | Mole percent VA | MI | Polyethylene Percent | Density | MI | Melt Index of Blend | Dart Drop,* g./ml. | Elmendorf Tear, g./ml. MD | TD | Secant Modulus Stiffness* MD | TD |
|---|---|---|---|---|---|---|---|---|---|---|---|---|---|---|---|
| 1 | 80 | 4 | 22 | 10 | 12 | 6.4 | 10 | .959 | 6.9 | 19.5 | 204 | 96 | 164 | 21.4 | 13.1 |
| 2 | 70 | 4 | 22 | 10 | 12 | 6.4 | 20 | .959 | 6.9 | 18.9 | 168 | 119 | 263 | 35.5 | 16.9 |
| 3 | 60 | 4 | 22 | 20 | 12 | 6.4 | 20 | .959 | 6.9 | 16.1 | 144 | 92 | 200 | 37.5 | 16.2 |
| 4 | 80 | 3.5 | 36.1 | 10 | 12 | 6.1 | 10 | .923 | 3.7 | 26.4 | >275 | 94 | 43 | 11.1 | 10.8 |
| 5 | 70 | 3.5 | 36.1 | 10 | 12 | 6.1 | 20 | .923 | 3.7 | 21.5 | >275 | 95 | 52 | 13.3 | 10.8 |
| 6 | 60 | 3.5 | 36.1 | 20 | 12 | 6.1 | 20 | .923 | 3.7 | 19.2 | >300 | 92 | 51 | 11.2 | 11.0 |
| 7 | 50 | 3.5 | 36.1 | 20 | 12 | 6.1 | 30 | .923 | 3.7 | 15.8 | 217 | 52 | 52 | 15.3 | 12.3 |

*ASTM D-1709–62T Method A using a 2" diameter dart and a 26" drop.

The blend compositions of the present invention are primarily employed in the manufacture of film which is used in industrial packaging applications, particularly in the bagging of chemicals such as fertilizer. The inertness of the ethylene polymers combined with the above-outlined mechanical properties makes these materials particularly suitable for such purposes. However, it is to be understood that the utility of the blends of the present invention is not limited to such applications, and the blends can be employed in all applications developed for polyethylene, such as molding, extrusion into fiber or pipe and in the coating of wire and other substrates.

Although the blends of the present invention are illustrated as three component blends, it is to be understood that the illustration is merely of the types of polymeric materials that are employed. Thus, it is feasible to employ two polyethylene components giving rise to a blend having the indicated properties for the polyethylene. Similarly, it is possible to have more than one acid copolymer present in the acid copolymer component of the blend. Additives normally employed with polyethylene, e.g., antioxidant, ultraviolet light stabilizers, slip additives, antistatic agents, pigments, etc., may also be added to the blends of the present invention.

I claim:

1. A blend comprising (a) about 50 to about 90% based on the weight of the blend of random ethylene/methacrylic acid copolymer in which the acid constitutes from 2 to 10 mole percent of the copolymer, said random copolymer having a melt index of 0.5 to 50 dg./min., (b) about 5 to about 45% polyethylene having a density of 0.910 to 0.970 g./cc. and a melt index of 0.1 to 20 dg./min. and (c) at least about 5% based on the weight of the blend of ethylene/vinyl acetate copolymer in which the vinyl acetate constitutes from 5 to 15 mole percent of the copolymer, said copolymer having a melt index of 0.5 to 20 dg./min.

2. The blend of claim 1 in the form of a film.

3. The blend of claim 1 having a melt index of about 15 to 25 dg./min.

4. The blend of claim 1 in which the polyethylene has a density of 0.945 to 0.970 g./cc. and the polyethylene is present to the extent of between 10 and 20 weight percent.

References Cited

UNITED STATES PATENTS

| | | | |
|---|---|---|---|
| 3,298,855 | 1/1967 | Helin et al. | 117—76 |
| 3,182,101 | 5/1965 | Rees | 260—885 |
| 3,248,359 | 4/1966 | Maloney | 260—41 |

FOREIGN PATENTS 87,132  9/1964  India.

GEORGE F. LESMES, *Primary Examiner.*

C. J. SECCURO, *Assistant Examiner.*